United States Patent [19]
Teichmann et al.

[11] 3,785,780
[45] Jan. 15, 1974

[54] REACTION VESSEL

[75] Inventors: Newton N. Teichmann; Chancey D. McKenna, both of Bethel Park; Albert Garrone, Canonsburg, all of Pa.

[73] Assignee: Henry F. Teichmann, Inc., Pittsburgh, Pa.

[22] Filed: Oct. 5, 1972

[21] Appl. No.: 295,169

[52] U.S. Cl. .............. 23/285, 23/284, 23/288 F, 23/260, 55/DIG. 30, 55/223, 261/DIG. 9, 261/121, 423/242, 423/212
[51] Int. Cl. .............................. B01d 53/34
[58] Field of Search ............... 23/277 R, 285, 284, 23/260, 288 F; 55/DIG. 30, 223; 261/DIG. 9, 721; 423/242, 212

[56] References Cited
UNITED STATES PATENTS
3,520,113 7/1970 Stokes ................... 423/242 X
1,760,246 5/1930 Maker et al. ................ 23/285
3,574,543 4/1972 Heredy .................. 423/242 X
3,563,029 2/1971 Lowes ................... 423/212 X Primary Examiner—James H. Tayman, Jr.
Attorney—Webb, Burden, Robinson & Webb, P.A.

[57] ABSTRACT

The reaction vessel accommodates a corrosive liquid bath such as molten carbonate and a reactant such as petroleum coke and air. The vessel includes an oxidation chamber and a reduction chamber separated by a tee-shaped baffle. A liquid level control chamber cooperates with the reduction chamber and also serves as the outlet. Orifices extend through the baffle so that there is a controlled flow and recirculation of the bath through the chambers. The reactant is injected into the oxidation chamber below the level of the bath. The vessel is lined with a refractory brick or block, an insulating refractory sealant, and sections of expanded metal or metal grating.

6 Claims, 10 Drawing Figures

PATENTED JAN 15 1974 3,785,780

REACTION VESSEL

BACKGROUND OF THE INVENTION

Our invention relates to reaction vessels and, more particularly, to reaction vessels which accommodate molten carbonate and which permit both an oxidation and a reduction reaction to take place within the single vessel.

A process has been developed to treat power plant stack gases so as to remove the sulfur oxide therefrom. This process includes contacting a molten mixture of alkaline metal carbonate salts with the stack gases which react with the carbonates to form metal sulfites and sulfates. This mixture is then treated so that the sulfites and sulfates are reduced to metal sulfide. The sulfide is then removed and the molten carbonate recycled. The reduction of the sulfite and sulfate to sulfide is a critical step since oxidation and reduction must occur in the same vessel. In order to obtain the desired sulfide product, it is necessary to substantially raise the temperature of the incoming melt, compensate for the endothermic reactions which take place, and compensate for the heat losses from the reducer vessel. The reaction vessel must, therefore, be able to accommodate these various reactions and heat transfers. In addition, the molten carbonate is highly corrosive and of a low viscosity thereby causing reactor lining problems.

A barrel-type furnace having concentric reaction zones has been proposed. The drawbacks of such a barrel-type vessel are of a very practical consideration and relate to the limited access to the zones, the logistics problems of handling a number of different materials within the confines of concentric zones and the control of the reactions which are simultaneously taking place. Further, the continuous metal shell required for the barrel-type furnace will not accommodate a composite lining of varying thermal expansion, nor will it properly withstand wide ranges of thermal expansion for a refractory lining of a single composition.

SUMMARY OF THE INVENTION

Our invention provides reaction zones which are carried out in rectangular, side by side chambers in which the liquid circulates between the chambers by means of orifices extending through a separating baffle. The vessel is designed for optimum control of bath level in the chambers and optimum exposure of the liquid to the reactants. The wall construction of the chambers protects against breakout of the corrosive materials contained within the vessel. Thermal expansion associated with the vessel is easily accommodated by the wall construction and supporting structure. In addition, the reaction vessel withstands internal pressure and can actually be pressurized. The vessel can be easily inspected through visual examination and minor breakouts immediately haulted by a cooling air stream.

Our vessel includes an oxidation chamber and a reduction chamber separated by a tee-shaped baffle having the leg portioon of the tee extending into the reduction chamber. Orifices extend through the baffle so that a maximum spaced circulation of the material occurs. A bath control chamber cooperates with the reduction chamber and is adjustable to control the level of the bath within the vessel. The reactant is introduced into the oxidation chamber below the level of the bath. A deflecting baffle is positioned within the oxidation chamber to assure the proper reaction sequence of the circulating bath. The protective lining consists of refractory brick or block and a refractory sealant with expanded metal or a metal grating therebetween.

DESCRIPTION OF THE PREFERRED EMBODIMENTS

Our reaction vessel, generally designated 10, will be described hereinafter as it relates to the reduction of sulfites and sulfates in the molten carbonate process. However, it will be recognized that the structure of the reaction vessel is also suited for additional applications where a low viscosity liquid is to be treated with a reactant and where time within the reaction vessel is critical.

Figure 1:
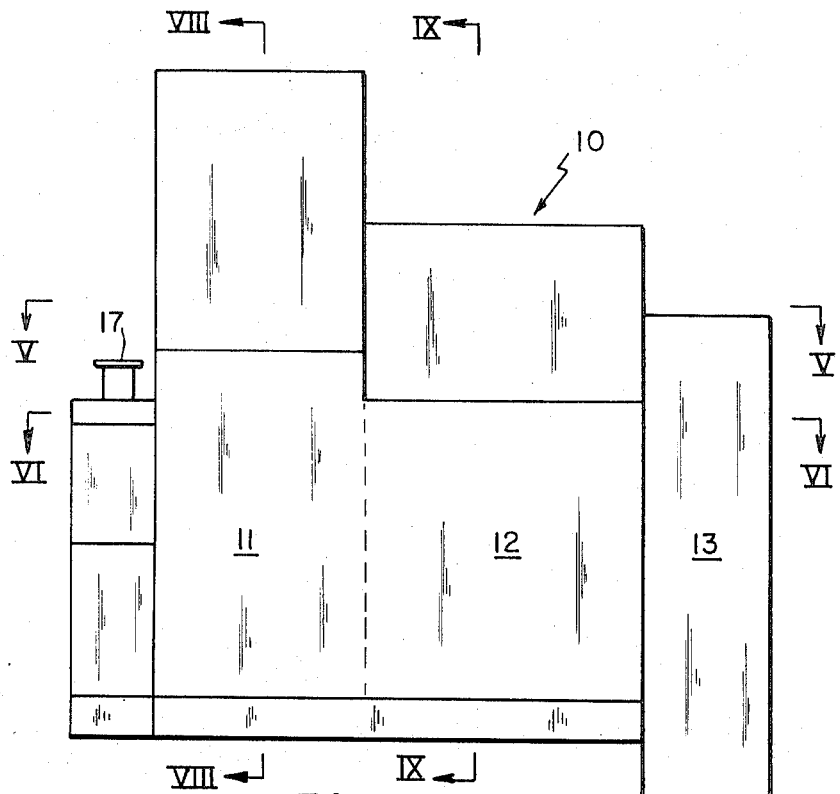
FIG. 1 is a side elevation of our reaction vessel.
Figure 2:
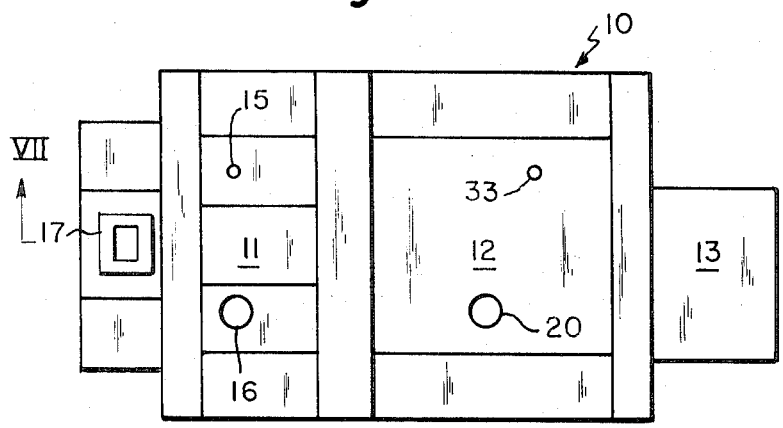
FIG. 2 is a plan view of our reaction vessel.

The reaction vessel 10 includes an oxidation chamber 11, a reduction chamber 12 and an outlet chamber 13, FIGS. 1 and 2.

Figures 3, 4:
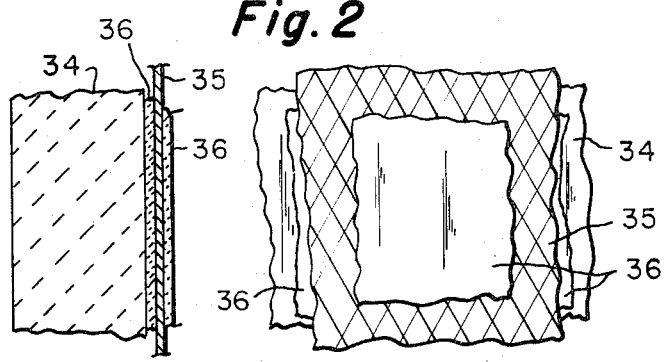
FIG. 3 is a section showing the wall construction.
FIG. 4 is a broken away elevation of the wall construction.

Because of the highly corrosive nature of the molten bath, a protective refractory such as one actuating high alumina is employed in brick or block form as the lining of the chambers and is referred to hereinafter as block 34. This refractory block 34 is covered with a refractory sealant material 36 and backed by expanded metal 35 which, in turn, is covered with the insulating refractory sealant material 36, FIGS. 3 and 4. A metal grating may also be employed and as used hereinafter the term expanded metal is understood to include such a metal grating. The purpose of the insulating refractory sealant material 36 is that the refractory block 34 maintains the bath in a molten state so any breakage in the block 34 or block joint would result in liquid spillage. The insulating refractory sealant material 36 is less refractory and it causes solidification of the molten bath should it break through or seep through the refractory block 34 or block joint, thereby minimizing any damage caused by a breakout. The entire vessel 10 is supported and retained in assembled relationship by means of a network of steel buckstays, tie rods and jack bolts, not shown, about the outer perimeter of the reaction vessel. This arrangement permits expansion and contraction of the vessel during the various heating and cooling periods. A support binding, not shown, holds down the vessel crown to withstand the outward forces when the vessel is pressurized.

Figure 5:
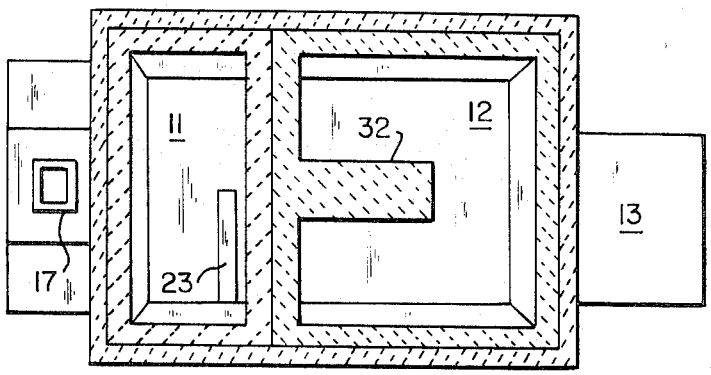
FIG. 5 is a section taken along section lines V—V of FIG. 1.
Figure 6:
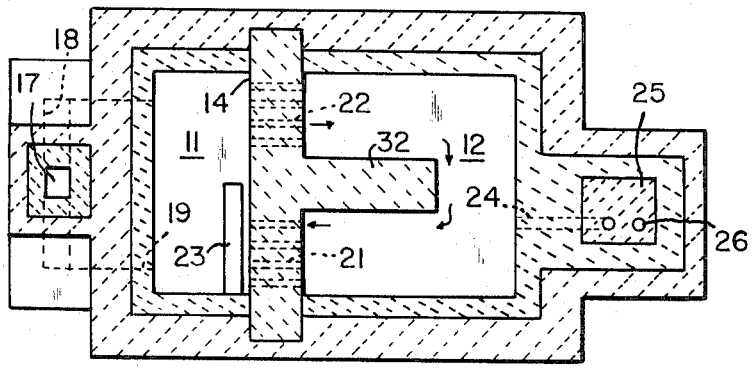
FIG. 6 is a section taken along section lines VI—VI of FIG. 1.
Figure 8:
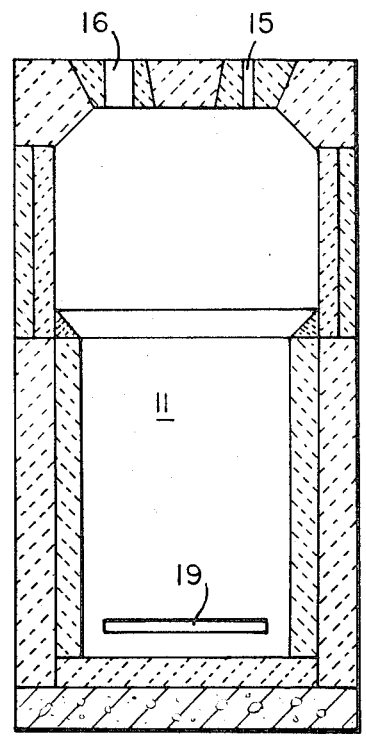
FIG. 8 is a section taken along section lines VIII—VIII of FIG. 1.

The oxidation chamber 11 and the reduction chamber 12 are rectangular in shape and are separated by a tee-shaped baffle 14, also constructed of highly refractory block, FIGS. 5 and 6. The reactant, air and petroleum coke in the case of the molten carbonate process, is introduced through a duct 17 which extends through an enlarged section 18 of the vessel end wall and enters into oxidation chamber 11 through an elongated nozzle type slot 19 near the bottom of the chamber 11, FIGS. 7 and 8. A carbonate inlet 15 communicates with the top of the oxidation chamber 11 through the refractory block which forms the roof for chamber 11 as does the gas outlet 16 which exits the nitrogen.

The reduction chamber 12 also includes a gas outlet 20 for carbon dioxide and nitrogen gas. An auxiliary carbonate inlet 33 can also be employed in the refractory block which forms the roof of the reduction chamber 12, if desired, FIG. 9.

Figure 9:
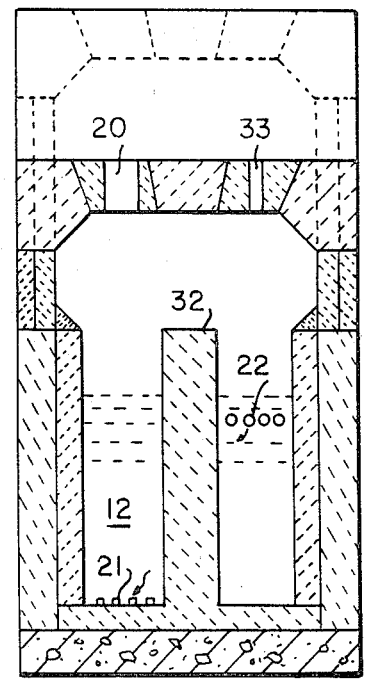
FIG. 9 is a section taken along section lines IX—IX of FIG. 1.

A plurality of lower orifices 21 extend through the tee-shaped baffle 14 in communication with the bottom of the oxidation chamber 11 and reduction chamber 12, FIGS. 6 and 9. These orifices 21 are positioned at one side of the chambers 11 and 12. A plurality of upper orifices 22 extend through the baffle 14 in communication with the upper end of the oxidation chamber 11 and reduction chamber 12 and are positioned at the opposing side of the chambers 11 and 12 from the lower orifices 21. The leg 32 of the tee-shaped baffle 14 extends into the reduction chamber 12 and is positioned intermittent of the lower orifices 21 and the upper orifices 22, FIG. 6. A deflection baffle 23 extends along the bottom of the oxidation chamber 11 so as to protect the lower orifices 21 from the incoming reactants through elongated slot 19, FIGS. 6 and 7.

Figure 7:
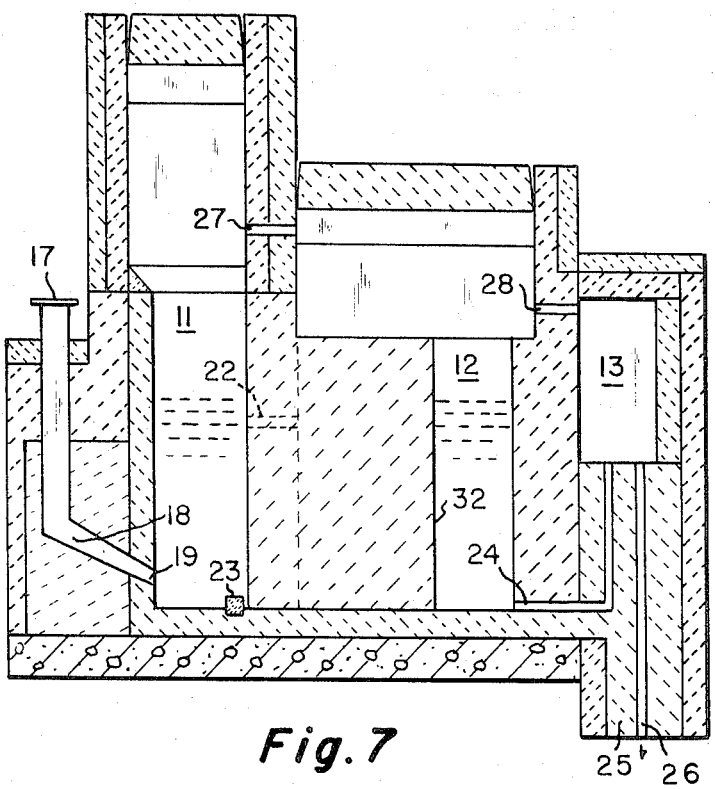
FIG. 7 is a section taken along sections lines VII—VII of FIG. 2.

The reduction chamber 12 is connected to the outlet chamber 13 by means of a duct 24 which exits from the bottom of reduction chamber 12, FIGS. 6 and 7. Chamber 13 is located above a built up section of refractory block 25 and the duct 24 extends upwardly through the block 25 into the chamber 13. An outlet 26 extends from chamber 13 through the block 25 and out of the reaction vessel 10. In order to stabilize the height of the bath in the various chambers, interconnecting openings are provided to equalize the pressure. Passageway 27 connects between the upper portion of oxidation chamber 11 and reduction chamber 12, and passageway 28 extends between the reduction chamber 12 and the outlet chamber 13.

Figure 10:
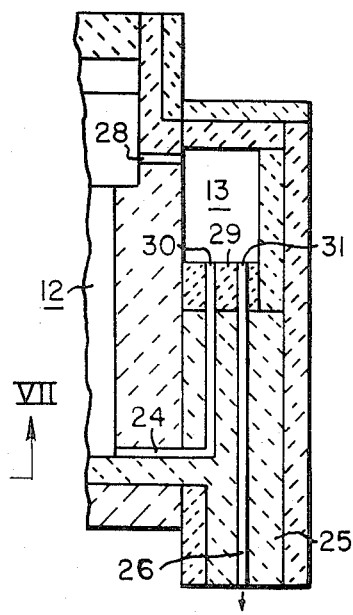
FIG. 10 is a section showing the bath control blocks.

The level of the bath can be controlled by adding or subtracting blocks 29 to the block wall 25 to vary the height of chamber 13, FIG. 10. The block 29 contains openings 30 and 31 which cooperate with duct 24 and outlet 26, respectively to form continuations thereof.

Our reaction vessel works as follows. The stack gases to be treated pass through a scrubber prior to entering the vessel where the sulfur oxides are removed by contacting the gas stream with a spray of molten carbonate at 850°F. The molten carbonate which is in the form of a salt of alkaline metal is fed into the reaction vessel 10 after it has been filtered to remove the ash. Air and petroleum coke are fed through nozzle 19 into the oxidation chamber 11 and the temperature of the melt is raised from 850° to 1,500°F by heat from the indirect combustion of part of the carbon from the petroleum coke with air. The temperature is sufficient to change the sulfates to sulfites which are, in turn, completely reduced to the alkaline metal sulfides by the reaction with the remainder of the carbon. The melt is recirculated between the oxidation and reduction chambers 11 and 12 and the flow rate therebetween is controlled through the size of the orifices 21 and 22 in the baffle 14 between the two chambers 11 and 12. The path of flow is from the oxidation chamber 11 through the upper orifices 22 into the reduction chamber 12; around the leg 32 of the baffle 14 and back into the oxidation chamber 11 through the lower orifices 21 on the opposing end of the baffle 14. The orifices 21 and 22 are sufficiently small to assure the necessary residence time in the reduction zone 12 and sufficiently large to permit flow to transport acquired heat without exceeding the proper reaction temperatures. The melt is drained from the outlet chamber 13 and the height of the block 29 which forms the outlet chamber 13 is controlled to control the height of the bath.

We claim:

1. A reaction vessel for treating a liquid with a reactant comprising:
   A. a first chamber;
   B. first inlet means for directing the liquid into the first chamber;
   C. second inlet means positioned near the bottom of the first chamber to introduce a reactant into the first chamber below the liquid level;
   D. a second chamber positioned adjacent the first chamber;
   E. a tee shaped baffle separating the first and second chamber, a leg of the tee extending into the second chamber;
   F. first orifice means extending through a lower portion of one end of the baffle on one of said leg and connecting said chambers;
   G. second orifice means extending through an upper portion of an opposing end of the baffle on an opposing side of said leg and connecting said chambers;
   H. outlet means exiting the second chamber means; and
   I. liquid level control means cooperating with the outlet means to control the level of the liquid in said chambers.

2. The vessel of claim 1 having a baffle positioned within the first chamber between the second inlet means and in the first orifice means.

3. The vessel of claim 1, said chambers defined by a refractory lining, an insulating refractory sealant, an expanded metallic binding positioned therebetween and encapsulated by said sealant.

4. A reaction vessel for treating molten carbonate containing sulfur oxides to reduce the sulfur oxides to sulfides comprising:
   A. an oxidizing chamber having molten carbonate inlet means at the top thereof, air and carbon compound inlet means along a side thereof exiting near the bottom thereof and gas outlet means through the top thereof;
   B. a reducing chamber positioned adjacent the oxidizing chamber and having gas outlet means through the top thereof;
   C. a tee-shaped baffle separating the oxidizing and reducing chambers, the leg of the tee extending into the reducing chamber;
   D. a plurality of lower orifices extending through a lower portion of one end of the baffle between said chambers;
   E. a plurality of upper orifices extending through an upper portion of an opposite end of the baffle between said chambers;

F. a bath control and exit chamber positioned adjacent the reducing chamber, said chamber positioned above an adjustable section of block;

G. a first passageway extending from the bottom of the reduction chamber through the block and into the bath control and exit chamber; and H. a second passageway exiting said chamber.

5. The reaction vessel of claim 4 including a baffle positioned within the oxidizing chamber between the air and carbon compound inlet means and the lower orifices.

6. A reaction vessel for treating a liquid with a reactant comprising:

A. a first chamber;

B. first inlet means for directing the liquid into the first chamber;

C. second inlet means positioned near the bottom of the first chamber to introduce a reactant into the first chamber below the liquid level;

D. a second chamber positioned adjacent the first chamber;

E. a baffle means separating the first and second chambers;

F. first orifice means extending through a lower portion of one end of the baffle connecting said chambers;

G. second orifice means extending through an upper portion of an opposing end of baffle means connecting said chambers;

H. outlet means exiting the second chamber means; and

I. liquid level control means cooperating with the outlet means to control the level of the liquid in said chambers and comprising a third chamber separated from the second chamber by a partition formed of block, said outlet means extending from a lower portion of the second chamber means through said block into said third chamber and second outlet means exiting through said block, the liquid level being controlled by the height of the block.

\* \* \* \* \*

UNITED STATES PATENT OFFICE
CERTIFICATE OF CORRECTION

Patent No. 3,785,780      Dated January 15, 1974

Inventor(s) Newton N. Teichmann and Chancey D. McKenna

It is certified that error appears in the above-identified patent and that said Letters Patent are hereby corrected as shown below:

Column 2 Line 39 --actuating-- should read --containing--.

Signed and sealed this 16th day of April 1974.

(SEAL)
Attest:

EDWARD M. FLETCHER, JR.
Attesting Officer

C. MARSHALL DANN
Commissioner of Patents